United States Patent
Jansson et al.

(10) Patent No.: US 11,574,627 B2
(45) Date of Patent: *Feb. 7, 2023

(54) MASKING SYSTEMS AND METHODS

(71) Applicant: Spotify AB, Stockholm (SE)

(72) Inventors: Andreas Jansson, Brooklyn, NY (US); Eric J. Humphrey, Brooklyn, NY (US); Rachel Malia Bittner, Brooklyn, NY (US); Sravana K. Reddy, Cambridge, MA (US)

(73) Assignee: Spotify AB, Stockholm (SE)

( * ) Notice: Subject to any disclaimer, the term of this patent is extended or adjusted under 35 U.S.C. 154(b) by 16 days.

This patent is subject to a terminal disclaimer.

(21) Appl. No.: 17/379,325

(22) Filed: Jul. 19, 2021

(65) Prior Publication Data
US 2022/0044672 A1    Feb. 10, 2022

Related U.S. Application Data

(63) Continuation of application No. 16/717,507, filed on Dec. 17, 2019, now Pat. No. 11,087,744.

(51) Int. Cl.
*G10L 15/08* (2006.01)
*G10L 15/14* (2006.01)
*G10L 15/187* (2013.01)

(52) U.S. Cl.
CPC .......... *G10L 15/083* (2013.01); *G10L 15/144* (2013.01); *G10L 15/187* (2013.01); *G10L 2015/088* (2013.01)

(58) Field of Classification Search
CPC ................. G10L 15/083; G10L 15/144; G10L 15/187; G10L 2015/088
See application file for complete search history.

(56) References Cited

U.S. PATENT DOCUMENTS

| | | |
|---|---|---|
| 6,967,275 B2 | 11/2005 | Ozick |
| 7,266,495 B1 | 9/2007 | Beaufays |
| 7,280,963 B1 | 10/2007 | Beaufays |
| 7,521,622 B1 | 4/2009 | Zhang |
| 8,541,676 B1 | 9/2013 | Waldman |
| 8,543,395 B2 | 9/2013 | Todic |
| 8,793,335 B2 | 7/2014 | Kim |

(Continued)

FOREIGN PATENT DOCUMENTS

| | | |
|---|---|---|
| EP | 2648100 | 5/2020 |
| EP | 3648100 A1 | 5/2020 |
| WO | 2017/192132 | 11/2017 |

OTHER PUBLICATIONS

"Turn off explicit content in Apple Music on Android", Apple (Jan. 31, 2019). Available at: https://support.apple.com/en-in/HT205255 <last visited Sep. 17, 2020>.

Badrinarayan et al., "Segnet: A deep convolutional encoder-decoder architecture for scene segmentation." IEEE Transactions on Pattern Analysis and Machine Intelligence (2016).

(Continued)

*Primary Examiner* — Susan I McFadden
(74) *Attorney, Agent, or Firm* — Merchant & Gould P.C.

(57) ABSTRACT

Term masking is performed by generating a time-alignment value for a plurality of units of sound in vocal audio content contained in a mixed audio track, force-aligning each of the plurality of units of sound to the vocal audio content based on the time-alignment value, thereby generating a plurality of force-aligned identifiable units of sound, identifying from the plurality of force-aligned units of sound a force-aligned unit of sound to be altered, and altering the identified force-aligned unit of sound.

20 Claims, 4 Drawing Sheets

(56) References Cited

U.S. PATENT DOCUMENTS

| | | | |
|---|---|---|---|
| 9,047,371 | B2 | 6/2015 | Mohajer et al. |
| 9,384,272 | B2 | 7/2016 | Bertin-Mahieux et al. |
| 9,405,741 | B1 | 8/2016 | Schaaf et al. |
| 9,412,365 | B2 | 8/2016 | Biadsy |
| 9,661,361 | B2 | 5/2017 | Sharifi |
| 10,141,010 | B1 | 11/2018 | Nichols |
| 10,839,826 | B2 | 11/2020 | Humphrey et al. |
| 11,087,744 | B2 | 8/2021 | Jansson |
| 2004/0064209 | A1 | 4/2004 | Zhang |
| 2007/0076902 | A1 | 4/2007 | Master |
| 2008/0097754 | A1 | 4/2008 | Goto et al. |
| 2009/0013004 | A1 | 1/2009 | Manukyan et al. |
| 2011/0054910 | A1 | 3/2011 | Fujihara et al. |
| 2011/0288862 | A1 | 11/2011 | Todic |
| 2012/0072841 | A1 | 3/2012 | Moricca |
| 2013/0226850 | A1 | 8/2013 | Hannuksela et al. |
| 2015/0025892 | A1 | 1/2015 | Lee et al. |
| 2015/0127347 | A1 | 5/2015 | Tjalve et al. |
| 2016/0029084 | A1 | 1/2016 | Jarman et al. |
| 2016/0093316 | A1 | 3/2016 | Paquier et al. |
| 2017/0047094 | A1 | 2/2017 | Leppanen et al. |
| 2018/0053519 | A1 | 2/2018 | Kulavik et al. |
| 2018/0366097 | A1 | 12/2018 | Sharp |
| 2019/0311745 | A1 | 10/2019 | Shenkler |

OTHER PUBLICATIONS

Bansal et al., "Pixelnet: To-wards a general pixel-level architecture." arXiv preprint arXiv:1609.06694 (2016).

Berenzweig, A. et al., "Locating singing voice segments within music signals," In Int'l Conference on Acoustics, Speech and Signal Processing (ICASSP), pp. 119-122. IEEE (2001).

Bittner et al., "MedleyDB: A multitrack dataset for annotation-intensive MIR research," In Proc. of the 15th Int'l Society for Music Information Retrieval Conf. (IS-MIR), vol. 14, pp. 155-160 (2014).

Brown, J., "Calculation of a constant q spectral transform," The Journal of the Acoustical Society of America, 89(1):425-434 (1991).

Brown, K., "Karaoke Idols: Popular Music and the Performance of Identity." Intellect Books, pp. 37-38 (2015).

Raffel, C. et al., "Optimizing DTW-based audio-to-MIDI alignment and matching," 2016 IEEE Int'l Conf. on Acoustics, Speech and Signal Processing (ICASSP), Shanghai, pp. 81-85 (2016).

Carterette, B. et al.;/, "Incremental test collections," In Proceedings of the 14th ACM Int'l Conference on Information and Knowledge Management, pp. 680-687. ACM, 2005.

Chan et al., "Vocal activity informed singing voice separation with the iKala dataset." Acoustics, Speech and Signal Processing (ICASSP), 2015 IEEE International Conference on, pp. 718-722. IEEE (2015).

Chandra et al., "Monoaural audio source separation using deep convolutional neural networks." International Conference on Latent Variable Analysis and Signal Separation, pp. 258-266. Springer (2017).

Deng et al., "ImageNet: A large-scale hierarchical image database," In Computer Vision and Pattern Recognition (CVPR), IEEE Conf. on, pp. 248-255 (2009).

Ellis et al., "Echoprint: An open music identification service," In Proc. of the 12th Int'l Society for Music Information Retrieval Conf. (ISMIR). ISMIR (2011).

Emiya et al., "Subjective and objective quality assessment of audio source separation." IEEE Transactions on Audio, Speech, and Language Processing, 19(7):2046-2057 (2011).

European Extended Search Report for EP Application No. 20 21 3387 dated May 17, 2021 (9 pages).

Ewert et al., "High resolution audio synchronization using chroma onset features," 2009 IEEE Int'l Conf. on Acoustics, Speech and Signal Processing, Taipei, pp. 1869-1872 (2009).

Fujihara, F. et al., "Three techniques for improving automatic synchronization between music and lyrics: Fricative detection, filler model, and novel feature vectors for vocal activity detection," 2008 IEEE Int'l Conf. on Acoustics, Speech and Signal Processing, Las Vegas, NV, pp. 69-72 (2008).

Goodfellow et al., "Deep learning." vol. 1. Cambridge: MIT press, 2016. Chapter 9: Convolutional Neural Networks.

Grais et al., "Single channel audio source separation using convolutional denoising autoencoders." arXiv preprint arXiv:1703.08019, 2017.

Griffin et al., "Signal estimation from modified short-time Fourier transform." IEEE Transactions on Acoustics, Speech, and Signal Processing 32.2 (1984): 236-243.

Hamel et al., "Temporal pooling and multiscale learning for automatic annotation and ranking of music audio," In Proc. of the 12th Int'l Society for Music Information Retrieval Conf. (ISMIR), pp. 729-734 (2011).

Huang et al., "Singing-voice separation from monaural recordings using deep recurrent neural net-works." Proc. of the 15th Int'l Society for Music Information Retrieval Conf., IS-MIR 2014, Taipei, Taiwan, pp. 477-482, Oct. 27-31, 2014 (2014).

Humphrey et al., "Mining labeled data from web-scale collections for vocal activity detection in music." Proc. of the 18th ISMIR Conference (2017).

Humphrey, E. and Bello, J., "Rethinking automatic chord recognition with convolutional neural networks," In Int'l Conf. on Machine Learning and Applications (ICMLA), vol. 2, pp. 357-362 (2012).

Isola et al., "Image-to-image translation with conditional adversarial networks" arXiv preprint arXiv:1611.07004 (2016).

Jannson et al., "Singing Voice Separation With Deep U-Net Convolutional Networks." 18th Int'l Society for Music Information Retrieval Conf., Suzhou, China (2017).

Kingma et al., "A method for stochastic optimization." arXiv preprint arXiv:1412.6980 (2014).

Lee et al., "Automatic labeling of training data for singing voice detection in musical audio." IASTED Int'l Conf. on Signal Processing, Pattern Recognition and Applications (SPPRA) (2009).

Lee et al., "Learning a Joint Embedding Space of Monophonic and Mixed Music Signals for Singing Voice." arXiv preprint arXiv:1906 .11139 (2019).

Leglaive et al., "Singing voice detection with deep recurrent neural networks," In Int'l Conf. on Acoustics, Speech and Signal Proc. (ICASSP), pp. 121-125 (2015).

Likert., "A technique for the measurement of attitudes." Archives of psychology (1932).

Long et al., "Fully convolutional networks for semantic segmentation." Proc. of the IEEE Conf. on Computer Vision and Pattern Recognition, pp. 3431-3440 (2015).

Luo et al., "Deep clustering and conventional networks for music separation: Stronger together." arXiv preprint arXiv:1611.06265 (2016).

Luo et al., "Deep clustering for singing voice separation." Creative Commons Attribution-Noncommercial-Share Alike 3.0 License (2010).

Maddage et al., "Singer identification based on vocal and instrumental models." Proce. of the 17th Int'l Conf. on Pattern Recognition, ICPR 2004, vol. 2. IEEE (2004).

Maddage et al., "A SVM C Based Classification Approach to Musical Audio" (2003).

Mauch, M. et al., "PYIN: A fundamental frequency estimator using probabilistic threshold distributions," In Int'l Conf. on Acoustics, Speech and Signal Proc. (ICASSP), pp. 659-663 (2014).

Mauch, M. et al., "Timbre and melody features for the recognition of vocal activity and instrumental solos in polyphonic music," In Proc. of the 12th Int'l Society for Music Information Retrieval Conf. (ISMIR), pp. 233-238 (2011).

McAuliffe et al., "Montreal Forced Aligner: trainable text-speech alignment using Kaldi", Interspeech 2017, Stockholm, Sweden, pp. 498-502 (Aug. 20-24, 2017).

Mesaros et al., "Automatic recognition of lyrics in singing." EURASIP Journal on Audio, Speech, and Music Processing, 2010(1):546047 (2010).

Mesaros et al., "Singer identification in polyphonic music using vocal separation and pattern recognition methods." Proc. of the 8th Int'l Conf. on Music Information Retrieval, ISMIR 2007, Vienna, Austria, pp. 375-378 (Sep. 23-27, 2007).

Murthy et al., "Vocal and Non-vocal Segmentation based on the Analysis of Formant Structure." 2017 Ninth Int'l Conf. on Advances in Pattern Recognition (ICAPR) (2017).

(56) References Cited

OTHER PUBLICATIONS

Noh et al., "Learning deconvolution network for semantic segmentation." Proc. of the IEEE Int. Conf. on Computer Vision, pp. 1520-1528 (2015).

Orio et al., "Music retrieval: A tutorial and re-view." Foundations and Trends R in Information Retrieval, 1(1):1-90 (2006).

Ozerov et al., "Adaptation of Bayesian models for single-channel source separation and its application to voice/music separation in popular songs." IEEE Transactions on Audio, Speech, and Language Processing, 15(5):1564-1578 (2007).

Pretet et al., "Singing Voice Separation: A Study on Training Data." Arixv.org. Cornell University Library, Jun. 6, 2019. 5 pages.

Raffel et al., "Large-scale content-based matching of MIDI and audio files," In Proc. of the 16th Int'l Society for Music Information Retrieval Conf. (ISMIR) (2015).

Raffel et al., "A transparent implementation of com-mon MIR metrics." Proc. of the 15th Int'l Society for Music Information Retrieval Conf., ISMIR 2014, Taipei, Taiwan, pp. 367-372 (Oct. 27-31, 2014).

Rafii et al., "Repeating pattern extraction technique (REPET): A simple method for music/voice separation," IEEE Transactions on Audio, Speech, and Language Processing, 21(1):73-84 (2013).

Ramona et al., "Vocal detection in music with support vector machines," In Int'l Conf. on Acoustics, Speech and Signal Proc. (ICASSP), pp. 1885-1888 (2008).

Regnier et al., "Singing voice detection in music tracks using direct voice vibrato detection," In Int'l Conf. on Acoustics, Speech and Signal Proc. (ICASSP), pp. 1685-1688 (2009).

Ronneberger et al., "U-net: Convolutional networks for biomedical image segmentation." Int'l Conf. on Medical Image Computing and Computer-Assisted Intervention, pp. 234-241 (2015).

Rosenblatt, F., "The perceptron: A probabilistic model for information storage and organization in the brain." Psychological review, vol. 65, No. 6, pp. 386-408 (1958).

Schlüter J., "Learning to pinpoint singing voice from weakly labeled examples," In Proceedings of the 17th Int'l Society for Music Information Retrieval Cont. (ISMIR) (2016).

Schlüter et al., "Musical onset detection with convolutional neural networks." 6th Int'l Workshop on Machine Learning and Music (MML), Prague, Czech Republic (2013).

Serra et al., "Chroma binary similarity and local alignment applied to cover song identification." IEEE Transactions on Audio, Speech, and Language Proc. 16.6: 1138-1151 (2008).

Simpson et al., "Deep karaoke: Extracting vocals from musical mixtures using a convolutional deep neural network." Int'l Conf. on Latent Variable Analysis and Signal Separation, pp. 429-436 (2015).

Simpson et al., "Deep Karaoke: Extracting vocals from musical mixtures using a convolutional deep neural network," In Latent Variable Analysis and Signal Separation, Int'l Conf. on, pp. 429-436 (2015).

Smaragdis et al., "Static and dynamic source separation using nonnegative factorizations: A unified view." IEEE Signal Processing Magazine, 31(3):66-75 (2014).

Stoller et al., "End-to-End Lyrics Alignment for Polyphonic Music Using an Audio-to-Character Recognition Model", arXiv:1902.06797 [cs.SD] (Feb. 18, 2019).

Tagg, P., "Analysing popular music: theory, method and practice." Popular music, 2:37-67 (1982).

Thiede et al., "PEAQ—The ITU standard for objective measurement of perceived audio quality." Journal of the Audio Engineering Society, 48(1/2):3-29 (2000).

Tzanetakis et al., "Musical genre classification of audio signals." IEEE Transactions on speech and audio processing, 10(5):293-302 (2002).

Vembu et al., "Separation of vocals from polyphonic audio recordings" ISMIR 2005, 6th Int'l Conf. on Music Information Retrieval, London, UK, Sep. 11-15, 2005, Proc., pp. 337-344 (2005).

Vincent et al., "Performance measurement in blind audio source separation." IEEE transactions on audio, speech, and language processing, 14(4):1462-1469 (2006).

Virtanen, V., "Monaural sound source separation by nonnegative matrix factorization with temporal continuity and sparseness criteria." IEEE transactions on audio, speech, and language processing, 15(3):1066-1074 (2007).

Wang et al., "Compensating for asynchronies between musical voices in score-performance alignment." 2015 IEEE Int'l Conf. on Acoustics, Speech and Signal Processing (ICASSP) (2015).

Wang et al., "Robust and Efficient Joint Alignment of Multiple Musical Performances," In IEEE/ACM Transactions on Audio, Speech, and Language Processing, vol. 24, No. 11, pp. 2132-2145 (Nov. 2016).

Zhang et al., "Colorful image colorization." European Conference on Computer Vision, pp. 649-666 (2016).

Zwillinger and Kokoska (eds.), "Probability and Statistics Tables and Formulae," Chapman & Hall, New York, NY (2000).

1

MASKING SYSTEMS AND METHODS

CROSS REFERENCE TO RELATED APPLICATIONS

This application is a Continuation of U.S. patent application Ser. No. 16/717,507, filed, Dec. 17, 2019, and which application is incorporated herein by reference. To the extend appropriate, a claim of priority is made to the above-disclosed application.

TECHNICAL FIELD

Example aspects described herein generally relate to audio processing, and more specifically to masking terms contained in audio content.

BACKGROUND

Typically, editing audio content to remove or replace words is performed manually. However, such manual methods do not scale to a large, dynamic catalog of media content items.

An abrupt stop or interruption in a segment of the vocal track is undesirable, such as when specific words in the vocal track are removed or replaced. One technical challenge associated with replacing specific words in media content involves timing the occurrence of the words within a mixed audio track. If the timing of the substitute content is less than ideal, the word removal process leaves a noticeable and undesirable gap. "Bleeping" out words entirely or rendering them in a completely different voice, pitch or tone can be jarring to listen to as well.

In view of the aforementioned problems, it would be desirable to have a system that can modify content so that changes to certain words or phrases within the content do not generate an undesirable gap and the replacement content sounds as similar as possible to the original words.

SUMMARY

The example embodiments described herein meet the above-identified needs by providing methods, systems and computer program products for performing term (e.g., a word or phrase) masking. Term masking is performed by identifying time segments, or intervals, in a mixed audio signal that contains one or more of a plurality of identifiable units of sound in vocal audio content to be muddled, and manipulating the vocal subcomponent exclusively.

One such approach is achieved by generating a time-alignment value for a plurality of identifiable units of sound in vocal audio content contained in a mixed audio track by force-aligning each of the plurality of identifiable units of sound to the vocal audio content based on the time-alignment value, thereby generating a plurality of force-aligned identifiable units of sound, identifying from the plurality of force-aligned identifiable units of sound a force-aligned identifiable unit of sound to be muddled, and audio muddling the force-aligned identifiable unit of sound to be muddled.

BRIEF DESCRIPTION OF THE DRAWINGS

The features and advantages of the example embodiments of the invention presented herein will become more apparent from the detailed description set forth below when taken in conjunction with the following drawings.

DETAILED DESCRIPTION

The example embodiments of the invention presented herein are directed to methods, systems and computer program products for masking a term (e.g., a word or phrase) in a mixed audio track, which are now described herein in terms of an example media content delivery system that provides media content items to media playback devices. This description is not intended to limit the application of the example embodiments presented herein. In fact, after reading the following description, it will be apparent to one skilled in the relevant art(s) how to implement the following example embodiments in alternative embodiments (e.g., media content recording systems, broadcasting systems that broadcast live or pre-recorded media content, and the like).

In addition, not all of the components are required to practice the invention, and variations in the arrangement and type of the components may be made without departing from the spirit or scope of the invention. As used herein, the terms "component" and "engine" are applied to describe a specific structure for performing specific associated functions, such as a special purpose computer as programmed to perform algorithms (e.g., processes) disclosed herein. The component (or engine) can take any of a variety of structural forms, including: instructions executable to perform algorithms to achieve a desired result, one or more processors (e.g., virtual or physical processors) executing instructions to perform algorithms to achieve a desired result, or one or more devices operating to perform algorithms to achieve a desired result.

The term "muddle", as used herein, means to bring into a disordered or confusing state.

Figure 1:
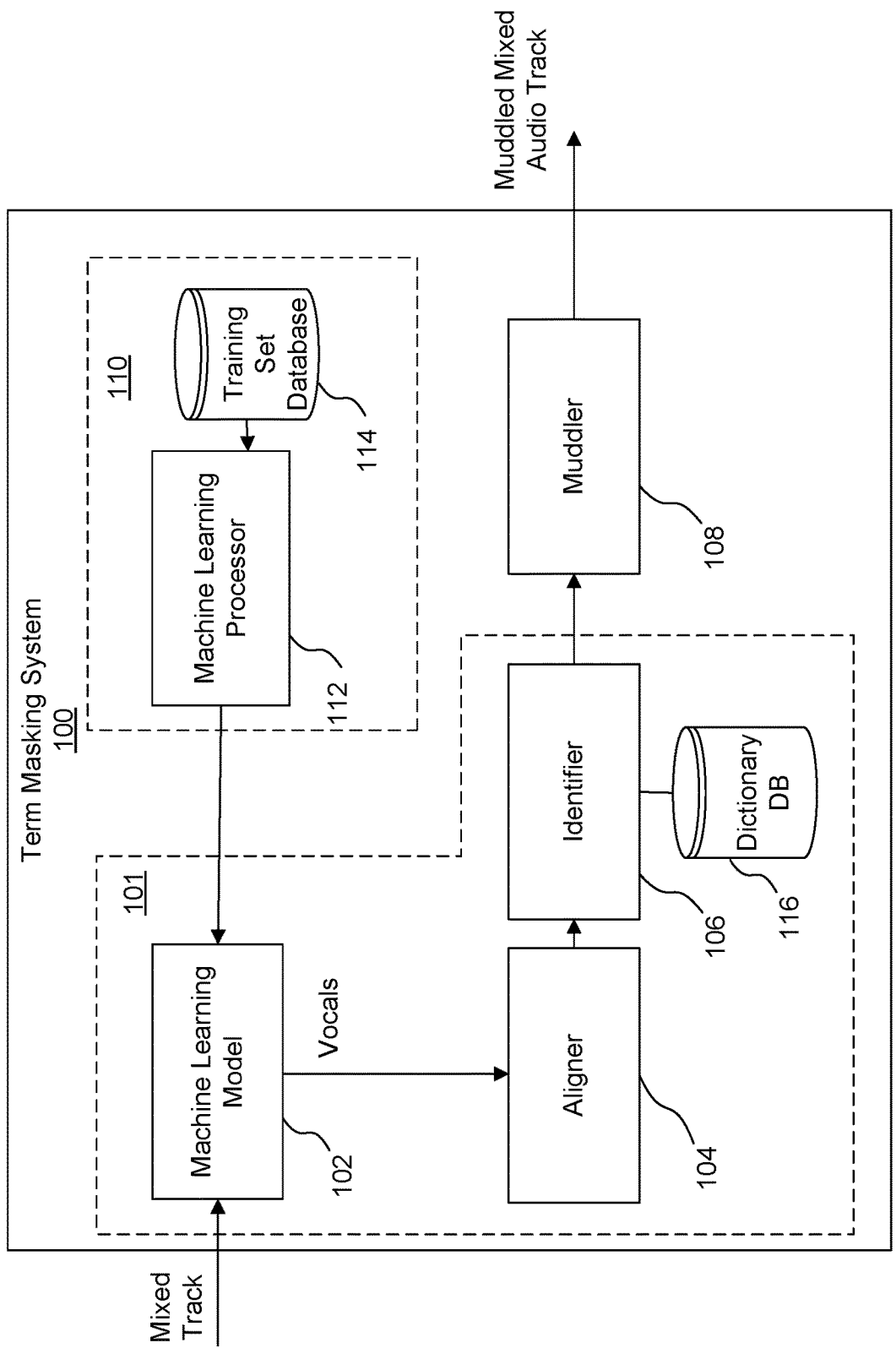
FIG. 1 illustrates an example term masking system in accordance with an embodiment of the present invention.

FIG. 1 illustrates an example term masking system 100 in accordance with an embodiment of the present invention. As shown in FIG. 1, term masking system 100 includes a machine learning model 102, an aligner 104, an identifier 106, a muddler 108, and a dictionary database 116. In some embodiments machine learning model 102, aligner 104, identifier 106 and dictionary database 116 are referred to collectively as a lyrics analyzer 101.

Term masking system 100 can also include a machine learning architecture 110 having a machine learning processor 112 communicatively coupled to a training set database 114. In an example embodiment, lyrics analyzer 101 is configured to receive mixed audio and to detect a time-span of a predetermined term within the mixed audio track. In turn, lyrics analyzer 101 muddles the region of the mixed audio track within the time-span to mask the term while preserving the cohesion of the overall content of the mixed audio track.

According to some example embodiments, the mixed audio track is a music audio signal. Machine learning model 102 is used to decompose the mixed audio track into its vocal component(s) (e.g., song lyrics) and accompanying component(s) (e.g., instrumentals). In some embodiments, machine learning model 102 has been trained by using machine learning processor 112 using a training set stored in training set database 114. Training set database 114, for example can be configured to have stored therein examples of songs with and without the vocal component(s) removed; e.g., instrumental versions or karaoke tracks. The machine learning processor takes these training examples and produces a model to transform any mixed audio signal into the separate components. The resulting separated vocal tracks are fed into the aligner 104.

In some embodiments, muddler 108 is configured to muddle certain terms by playing the term audio backwards. By default the audio is the same duration as before and still the same vocalist, but the term is not intelligible.

In one example embodiment, aligner 104 is configured to generate a time-alignment value for each of a plurality of identifiable units of sound in vocal audio content contained in the mixed audio track. Force-alignment as used herein means to align an audio file with an utterance at a word level or phonetic level. Aligner 104 is further configured to force-align each of the identifiable units of sound to the vocal audio content based on the time-alignment value, thus generating a plurality of force-aligned identifiable units of sound. Identifier 106 is configured to identify from the force-aligned identifiable units of sound a force-aligned identifiable unit of sound to be muddled. Muddler 108 then audio muddles the force-aligned identifiable unit of sound.

In an example implementation, the force-aligned identifiable unit of sound in the vocal audio content to be muddled is predefined as being explicit content. For purposes of the embodiments described herein, the term "explicit" means describing, denoting or representing sexual activity in a graphic fashion and/or by using vulgar or offensive language. Terms (e.g., a word or phrase) corresponding to such explicit content can be stored in dictionary database 116.

In some example embodiments, aligner 104 is further configured to identify the force-aligned identifiable unit of sound to be muddled by comparing the dictionary of terms stored in dictionary database 116 against the force-aligned identifiable units of sound and matching at least one of the terms in the dictionary database 116 to the plurality of force-aligned identifiable units of sound.

In some embodiments, aligner 104 is further configured to perform the force-aligning by using (i) a Hidden Markov model, (ii) a plurality of Mel-frequency cepstral coefficients (MFCCs), and (iii) a dynamic programming algorithm. In an example embodiment, aligner 104 uses the Hidden Markov Model to compute a mapping between words and acoustics represented by MFCCs. In turn, aligner 104 causes the dynamic programming algorithm to use the Hidden Markov Model to match the lyrics of the track to the time locations where each word in the lyrics occurs.

Muddler 108 can be configured to perform the muddling by generating a backwards version of the force-aligned identifiable unit of sound to be muddled.

In some embodiments, machine learning model 102 is trained on original and instrumental-only pairs of songs. In some embodiments, the machine learning model 102 is trained on a plurality of pairs of original and instrumental-only magnitude spectrograms.

In some embodiments, machine learning model 102 is configured to separate vocal audio content from the mixed audio track, wherein the vocal audio content contains lyrics. Each of the plurality of the identifiable units of sound in the vocal audio content corresponds to at least one of (i) a term in lyrics, (ii) a phoneme in the lyrics, or (iii) both (i) and (ii).

Figure 2:
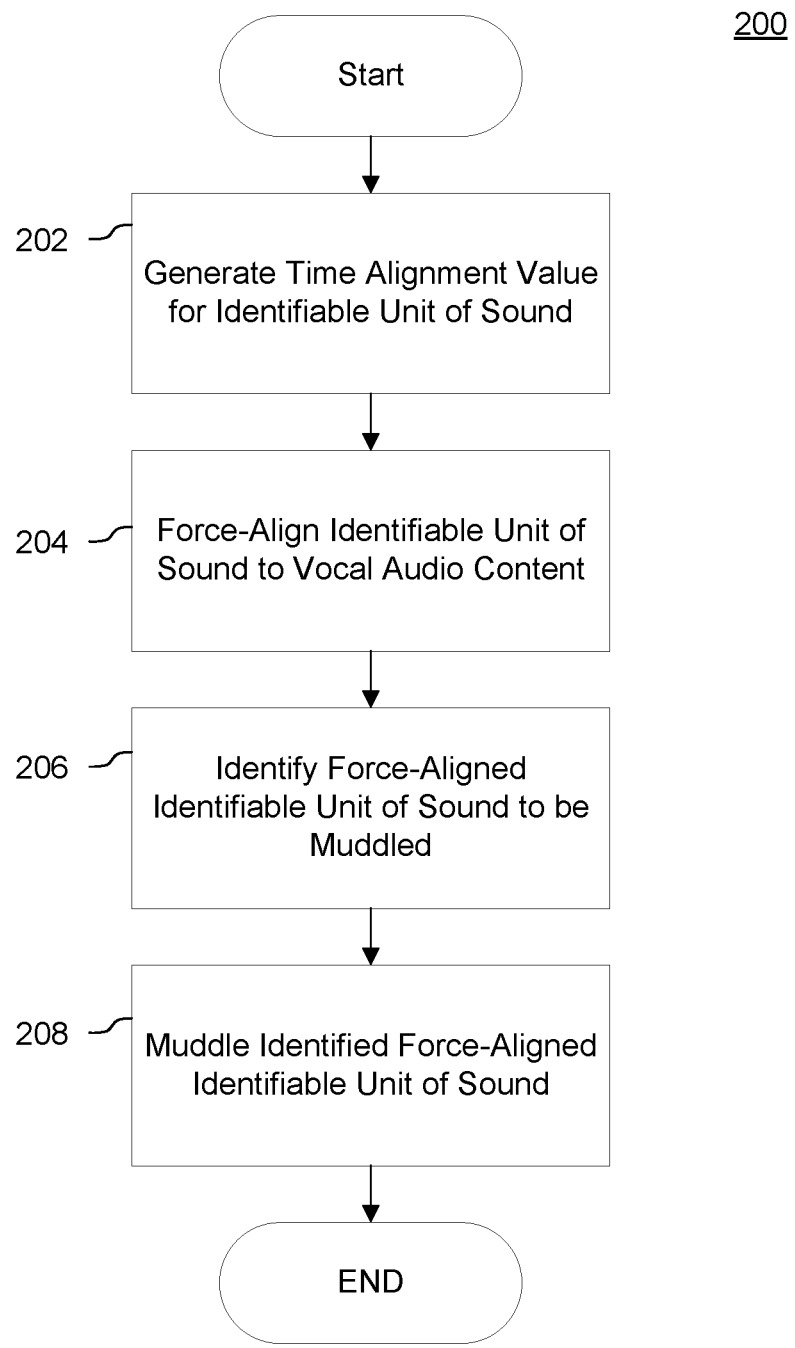
FIG. 2 depicts a procedure for performing term masking in accordance with an example embodiment of the present invention

FIG. 2 depicts a procedure 200 for performing term masking in accordance with an example embodiment of the present invention. As shown in FIG. 2, at block 202, procedure 200 performs generating a time-alignment value for each of a plurality of identifiable units of sound in vocal audio content contained in a mixed audio track. In block 204, the method performs force-aligning each of the plural identifiable units of sound to the vocal audio content based on a corresponding time-alignment value, thereby generating a plurality of force-aligned identifiable units of sound. In turn, the method performs identifying, from the plurality of force-aligned identifiable units of sound, a force-aligned identifiable unit of sound to be muddled, as shown in block 206. Next, audio muddling is performed on the force-aligned identifiable unit of sound to be muddled as shown in block 208.

In some embodiments, the force-aligned identifiable unit of sound in the vocal audio content to be muddled is predefined as being explicit content. In some embodiments, each of the plurality of the identifiable units of sound in the vocal audio content corresponds to at least one of (i) terms in lyrics, (ii) a phoneme in the lyrics, or (iii) both (i) and (ii).

In some embodiments, term masking further includes separating vocal audio content from the mixed audio track, where the vocal audio content contains lyrics, as described in further detail in U.S. patent application Ser. No. 15/974, 767, filed on May 9, 2018, which is hereby incorporated by reference herein in its entirety. In an example implementation, a vocal audio content is separated from a mixed audio track by searching for signals representing plural versions of a mixed audio track.

In some embodiments feature representations of the plural versions of the mixed audio track identified in the searching are determined and the feature representations determined in the determining are aligned. In turn, a time varying activity signal is extracted from the feature representations aligned by the alignment. The time varying activity signal is a vocal activity signal (i.e., the vocal audio content), one of the plural versions of the mixed audio track is an instrumental track, and another one of the plural versions of the track is a non-instrumental track.

According to one example embodiment, the searching includes identifying a first track among the plural versions of the mixed audio track as the instrumental track and a second track among the plural versions of the mixed audio track as the non-instrumental track.

According to an example embodiment, the determining includes determining a Time-Frequency Representation (TFR) of the plural versions of the track identified in the searching, the TFR is a Constant-Q Transform representation, and the aligning includes Dynamic Time Warping (DTW). Also, the extracting can include determining a residual based on the feature representations aligned in the aligning. In an example embodiment, determining the residual based on the feature representations aligned in the aligning is performed by determining an amplitude of a time-frequency path defining the time varying activity signal.

In a further example embodiment herein, the method further comprises removing suspect signals from the plural versions of the mixed audio track searched in the searching. Additionally, the suspect signals can be detected by determining that at least two of the signals representing plural versions of the mixed audio track overlap to a first predetermined extent, or do not overlap to a second predetermined extent.

It should be understood that separating vocal audio content from the mixed audio track can be performed by other now known or future developed methodologies.

Force alignment of the plural identifiable units of sound to be muddled to the vocal audio content can be performed by a number of techniques. In an example implementation, the force-aligning is performed by using (i) a Hidden Markov model, (ii) a plurality of Mel-frequency cepstral coefficients (MFCCs), and (iii) a dynamic programming algorithm. As explained above, in an example embodiment the Hidden Markov Model is used to compute a mapping between words and acoustics represented by MFCCs. In turn, the dynamic programming algorithm uses the Hidden Markov Model to match the lyrics of a track to the time locations where each word in the lyrics occurs.

A computer implemented method according to an example aspect of the present invention performs computing a mapping between words and acoustics represented by MFCC's using a Hidden Markov Model. In turn, the method performs matching, using a dynamic programming algorithm, the lyrics of a track to time locations, where each word in the lyrics occurs, where the dynamic programming algorithm uses (i.e., runs) the Hidden Markov Model.

In one example implementation the identifiable unit of sound to be muddled is identified by comparing a dictionary of terms against the plurality of force-aligned identifiable units of sound and matching at least one of the terms in the dictionary to the plurality of force-aligned identifiable unit of sound.

In one example implementation the audio muddling is performed by generating a backwards version of the force-aligned identifiable unit of sound to be muddled.

The machine learning model is trained on original and instrumental-only pairs of songs.

Figure 3:
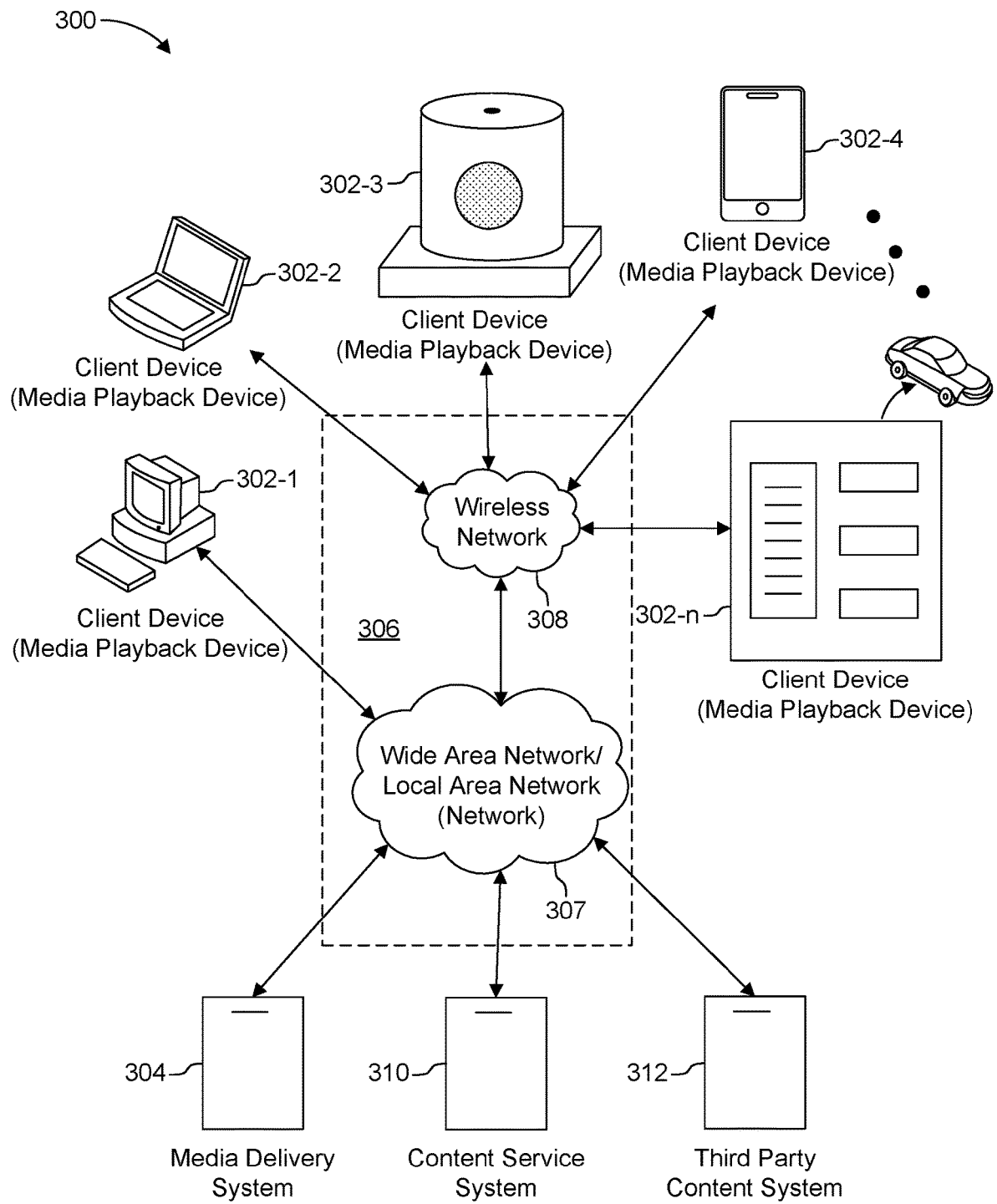
FIG. 3 illustrates example media playback system components for providing media content to a user in accordance with an embodiment of the present invention.

FIG. 3 is a representative view of a system 300 in which some embodiments of the invention may be implemented. System 300 of FIG. 2 includes wide area networks/local area networks ("LANs/WANs")—(LAN/WAN network) 307, wireless network 308, client devices operating as media playback devices 302-1, 302-2, 302-3, 302-4, . . . , 302-n (referred to collectively and individually as media playback device 302), a media delivery system 304, a content service system 310, and a third party content system 312.

LAN/WAN network 307 and wireless network 308 are referred to collectively and individually hereinafter as network 306. The network 306 is a data communication network that facilitates data communication between the media playback device 302 and the media delivery system 304.

Generally, the media delivery system 304 operates to enable media playback devices 302 to receive content. In various embodiments, such content may include, but is not limited to media content such as music, podcast, video, games, books and the like, as well as webpage content, advertisements, professionally generated content (non-UGC content), search results, blogs, and/or any of a variety of user generated content for access by another client device. In an example embodiment, the media delivery system 304 generates playlists which contain lists of media objects that are used to retrieve corresponding content from content service system 310 or third party content system 312. In some embodiments, the lists of media objects (e.g., music objects, video objects, game objects, book objects and the like) are in the form of media contexts (e.g., playlists, albums, etc.). In some embodiments, the media delivery system 304 further operates to enable media playback devices 302 to receive additional content (e.g., other media content items) from third parties via third party content system 312 which can be played back in conjunction with the content provided by content service system 310. In some embodiments, the additional content provided by third party content system 312 is played back between individual media content items provided by content service system 310. In other embodiments the additional content provided by third party content system 312 is played back in parallel with the content provided by content service system 310 (e.g., as an overlay media content item).

In some embodiments, media delivery system 304, content service system 310, and third party content system 312 are the same system component. In some embodiments, media delivery system 304, content service system 310, and third party content system 312 are different components.

An example of the media playback device 302 and an example media delivery system 304 in accordance with the present invention are illustrated and described in more detail below with reference to FIG. 4.

Example System Implementation

Figure 4:
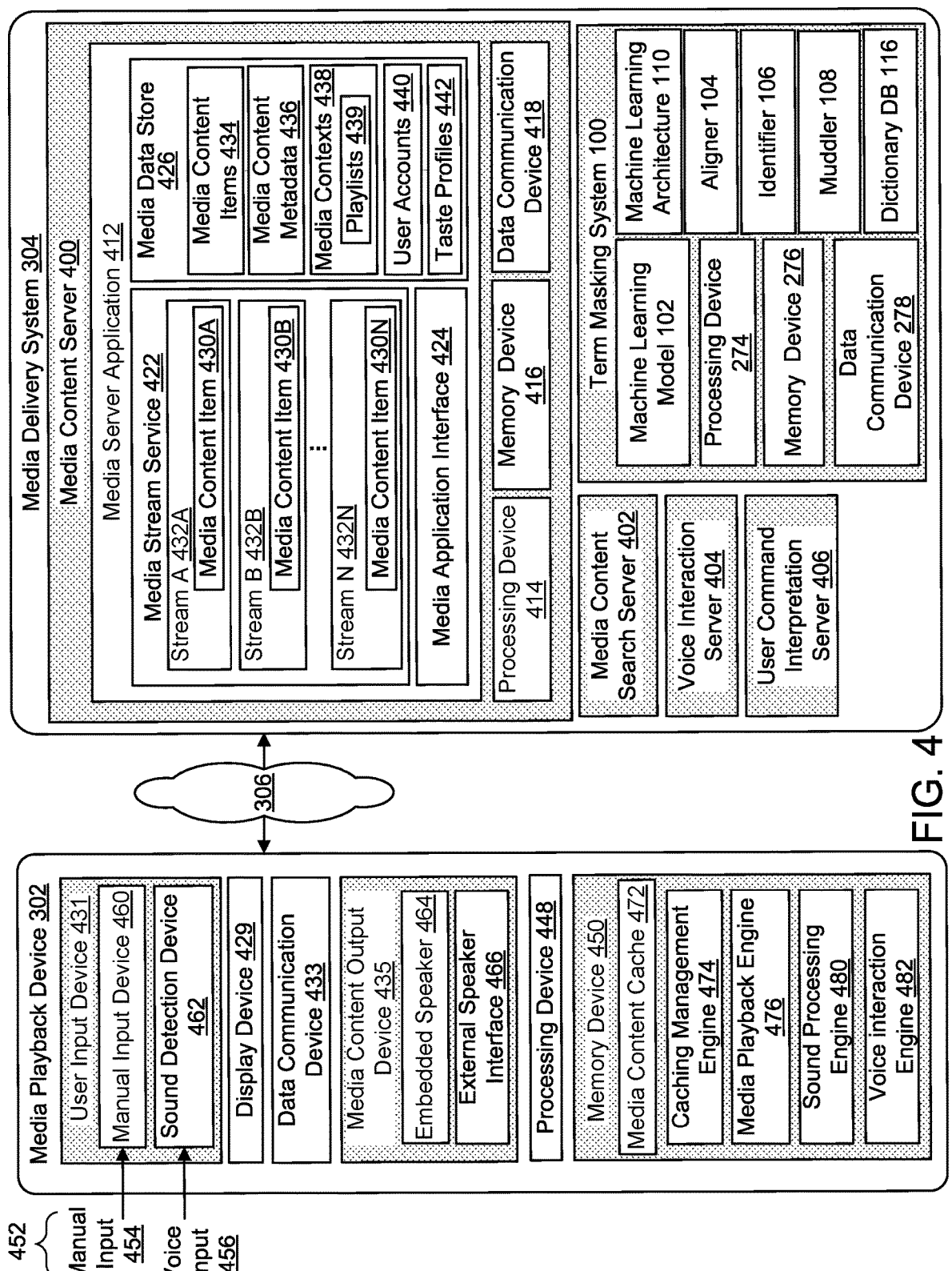
FIG. 4 is a representative view of a system in which some embodiments of the invention may be implemented.

FIG. 4 is a representative view of a system in which some embodiments of the invention may be implemented. The media delivery system 304 operates to provide media content to one or more media playback devices 302, such as the media playback device 302, via the network 306.

In this document, the media content that is currently playing, queued to be played, or has been previously played can be represented as a first media content item. In addition, the media content that will be played after the first media content item is referred to as a second media content item. Further, the media content that will be played after the second media content item is referred to as a third media content item. The first media content item, the second media content item, and the third media content item can be of various types. In some embodiments, the first media content item and/or the second media content item can be media content items 430A, 430B, . . . 430N (collectively and/or individually sometimes referred to simply as media content item 430) or media content item 434. Alternatively, the first media content item, the second media content item and/or the third media content item can be playlists 439. In still other embodiments, the first media content item, the second media content item and/or the third media content item can be of other types of media contexts 438.

In some embodiments, a query can be provided via a manual input 454. In other embodiments a query can be provided via a voice input 456. A voice input 456, can be a voice request received through a sound detection device (e.g., a microphone). As described herein, the voice request can be processed into a text query suitable for media content search. In other embodiments, the query can be a text that is typed using the media playback device 302 or another computing device.

Still referring to FIG. 4, in this example, the media playback device 302 includes a user input device 431, a display device 429, a data communication device 433, a media content output device 435, a processing device 448, and a memory device 450.

The media playback device 302 operates to play media content. For example, the media playback device 302 is configured to play media content that is provided (e.g., streamed or transmitted) by a system external to the media playback device 302, such as the media delivery system 304, another system, or a peer device. In other examples, the media playback device 302 operates to play media content stored locally on the media playback device 302. In yet other examples, the media playback device 302 operates to play media content that is stored locally as well as media content provided by other systems.

In some embodiments, the media playback device 302 is a handheld or portable entertainment device, smart speaker, smartphone, tablet, watch, wearable device, or any other type of computing device capable of playing media content. In other embodiments, the media playback device 302 is a laptop computer, desktop computer, television, gaming console, set-top box, network appliance, blue-ray or DVD player, media player, stereo, or radio, some examples of which are depicted in FIG. 3.

The user input device 431 operates to receive a user input 452 from a user for controlling the media playback device 302. As illustrated, the user input 452 can include a manual input 454 and a voice input 456. In some embodiments, the user input device 431 includes a manual input device 460. In some embodiments the user input device 431 includes a sound detection device 462.

The manual input device 460 operates to receive the manual input 454 for controlling playback of media content via the media playback device 302. In some embodiments, the manual input device 460 includes one or more buttons, keys, touch levers, switches, and/or other mechanical input devices for receiving the manual input 454. For example, the manual input device 460 includes a text entry interface, such as a mechanical keyboard, a virtual keyboard, or a handwriting input device, which is configured to receive a text input, such as a text version of a user query. In addition, in some embodiments, the manual input 454 is received for managing various pieces of information transmitted via the media playback device 302 and/or controlling other functions or aspects associated with the media playback device 302.

The sound detection device 462 operates to detect and record sounds from proximate the media playback device 302. For example, the sound detection device 462 can detect sounds including the voice input 456. In some embodiments, the sound detection device 462 includes one or more acoustic sensors configured to detect sounds proximate the media playback device 302. For example, acoustic sensors of the sound detection device 462 include one or more microphones. Various types of microphones can be used for the sound detection device 462 of the media playback device 302.

In some embodiments, the voice input 456 is a voice of a user (also referred to herein as an utterance) for controlling playback of media content via the media playback device 302. For example, the voice input 456 includes a voice version of a user query received from the sound detection device 462 of the media playback device 302. In addition, the voice input 456 is a voice of a user for managing various data transmitted via the media playback device 302 and/or controlling other functions or aspects associated with the media playback device 302.

In some embodiments, the sounds detected by the sound detection device 462 can be processed by the sound processing engine 180 of the media playback device 302 as described below.

Referring still to FIG. 4, the display device 429 operates to display information to a user. Examples of such information include media content playback information, notifications, and other information. In some embodiments, the display device 429 is configured as a touch sensitive display and includes the manual input device 460 of the user input device 431 for receiving the manual input 454 from a selector (e.g., a finger, stylus etc.) controlled by the user (e.g., user U of FIG. 1). In some embodiments, therefore, the display device 429 operates as both a display device and a user input device. The touch sensitive display device 429 operates to detect inputs based on one or both of touches and near-touches. In some embodiments, the display device 429 displays a graphical user interface for interacting with the media playback device 302. Other embodiments of the display device 429 do not include a touch sensitive display screen. Some embodiments include a display device and one or more separate user interface devices. Further, some embodiments do not include a display device.

The data communication device 433 operates to enable the media playback device 302 to communicate with one or more computing devices over one or more networks, such as the network 306. For example, the data communication device 433 is configured to communicate with the media delivery system 304 and receive media content from the media delivery system 304 at least partially via the network 306. The data communication device 433 can be a network interface of various types which connects the media playback device 302 to the network 306.

The network 306 typically includes a set of computing devices and communication links between the computing devices. The computing devices in the network 306 use the links to enable communication among the computing devices in the network. The network 306 can include one or more routers, switches, mobile access points, bridges, hubs, intrusion detection devices, storage devices, standalone server devices, blade server devices, sensors, desktop computers, firewall devices, laptop computers, handheld computers, mobile telephones, vehicular computing devices, and other types of computing devices.

In various embodiments, the network 306 includes various types of communication links. For example, the network 306 can include wired and/or wireless links, including cellular, Bluetooth®, Wi-Fi, ultra-wideband (UWB), 802.11, ZigBee, near field communication (NFC), an ultrasonic data transmission, and other types of wireless links. Furthermore, in various embodiments, the network 306 is implemented at various scales. For example, the network 306 can be implemented as one or more vehicle area networks, local area networks (LANs), metropolitan area networks, subnets, wide area networks (WAN) (such as the Internet), or can be implemented at another scale. Further, in some embodiments, the network 306 includes multiple networks, which may be of the same type or of multiple different types.

Examples of the data communication device 433 include wired network interfaces and wireless network interfaces. Wireless network interfaces include infrared, BLUETOOTH® wireless technology, 802.11a/b/g/n/ac, and cellular or other radio frequency interfaces in at least some possible embodiments. Examples of cellular network technologies include LTE, WiMAX, UMTS, CDMA2000, GSM, cellular digital packet data (CDPD), and Mobitex.

The media content output device 435 operates to output media content. In some embodiments, the media content output device 435 generates the media output for the user. In some embodiments, the media content output device 435 includes one or more embedded speakers 464 which are incorporated in the media playback device 302.

Alternatively or in addition, some embodiments of the media playback device 302 include an external speaker interface 466 as an alternative output of media content. The external speaker interface 466 is configured to connect the media playback device 302 to another system having one or more speakers, such as headphones, a portal speaker, and a vehicle entertainment system, so that the media output is generated via the speakers of the other system external to the media playback device 302. Examples of the external speaker interface 466 include an audio output jack, a USB port, a Bluetooth transmitter, a display panel, and a video output jack. Other embodiments are possible as well. For example, the external speaker interface 466 is configured to transmit a signal that can be used to reproduce an audio signal by a connected or paired device such as headphones or a speaker.

The processing device 448, in some embodiments, comprises one or more central processing units (CPU). In other embodiments, the processing device 448 additionally or alternatively includes one or more digital signal processors, field-programmable gate arrays, or other electronic circuits.

The memory device 450 typically includes at least some form of computer-readable media. The memory device 450 can include at least one data storage device. Computer readable media includes any available media that can be accessed by the media playback device 302. By way of example, computer-readable media is non-transitory and includes computer readable storage media and computer readable communication media.

Computer readable storage media includes volatile and nonvolatile, removable and non-removable media implemented in any device configured to store information such as computer readable instructions, data structures, program modules, or other data. Computer readable storage media includes, but is not limited to, random access memory, read only memory, electrically erasable programmable read only memory, flash memory and other memory technology, compact disc read only memory, blue ray discs, digital versatile discs or other optical storage, magnetic storage devices, or any other medium that can be used to store the desired information and that can be accessed by the media playback device 302. In some embodiments, computer readable storage media is non-transitory computer readable storage media.

Computer readable communication media typically embodies computer readable instructions, data structures, program modules or other data in a modulated data signal such as a carrier wave or other transport mechanism and includes any information delivery media. The term "modulated data signal" refers to a signal that has one or more of its characteristics set or changed in such a manner as to encode information in the signal. By way of example, computer readable communication media includes wired media such as a wired network or direct-wired connection, and wireless media such as acoustic, radio frequency, infrared, and other wireless media. Combinations of any of the above are also included within the scope of computer readable media.

The memory device 450 operates to store data and instructions. In some embodiments, the memory device 450 stores instructions for a media content cache 472, a caching management engine 474, a media playback engine 476, a sound processing engine 180, and a voice interaction engine 182.

Some embodiments of the memory device 450 include the media content cache 472. The media content cache 472 stores media content items, such as media content items that have been received from the media delivery system 304. The media content items stored in the media content cache 472 may be stored in an encrypted or unencrypted format. In some embodiments, the media content cache 472 also stores metadata about media content items such as title, artist name, album name, length, genre, mood, era, etc. The media content cache 472 can further store playback information about the media content items and/or other information associated with the media content items.

The caching management engine 474 is configured to receive and cache media content in the media content cache 472 and manage the media content stored in the media content cache 472. In some embodiments, when media content is streamed from the media delivery system 304, the caching management engine 474 operates to cache at least a portion of the media content into the media content cache 472. In other embodiments, the caching management engine 474 operates to cache at least a portion of media content into the media content cache 472 while online so that the cached media content is retrieved for playback while the media playback device 302 is offline.

The media playback engine 476 operates to play media content to a user. As described herein, the media playback engine 476 is configured to communicate with the media delivery system 304 to receive one or more media content items (e.g., through a media stream 432). In other embodiments, the media playback engine 476 is configured to play media content that is locally stored in the media playback device 302.

In some embodiments, the media playback engine 476 operates to retrieve one or more media content items that are either locally stored in the media playback device 302 or remotely stored in the media delivery system 304. In some embodiments, the media playback engine 476 is configured to send a request to the media delivery system 304 for media content items and receive information about such media content items for playback.

The sound processing engine 480 is configured to receive sound signals obtained from the sound detection device 462 and process the sound signals to identify different sources of the sounds received via the sound detection device 462. In some embodiments, the sound processing engine 480 operates to filter the voice input 456 (e.g., a voice request of a user query) from noises included in the detected sounds. Various noise cancellation technologies, such as active noise control or cancelling technologies or passive noise control or cancelling technologies, can be used to filter the voice input from ambient noise. In examples, the sound processing engine 480 filters out omni-directional noise and preserves directional noise (e.g., an audio input difference between two microphones) in audio input. In examples, the sound processing engine 480 removes frequencies above or below human speaking voice frequencies. In examples, the sound processing engine 480 subtracts audio output of the device from the audio input to filter out the audio content being provided by the device (e.g., to reduce the need of the user to shout over playing music). In examples, the sound processing engine 480 performs echo cancellation. By using one or more of these techniques, the sound processing engine 480 provides sound processing customized for use in a vehicle environment.

In other embodiments, the sound processing engine 180 operates to process the received sound signals to identify the sources of particular sounds of the sound signals, such as people's conversation in the vehicle, the vehicle engine sound, or other ambient sounds associated with the vehicle.

In some embodiments, the sound processing engine 480 at least partially operates to analyze a recording of sounds captured using the sound detection device 462, using speech recognition technology to identify terms spoken by the user. In addition or alternatively, other computing devices, such as the media delivery system 304 (e.g., a voice interaction server 404 thereof) can cooperate with the media playback device 302 for such analysis. The terms may be recognized as commands from the user that alter the playback of media content and/or other functions or aspects of the media playback device 302. In some embodiments, the terms and/or the recordings may also be analyzed using natural language processing and/or intent recognition technology to determine appropriate actions to take based on the spoken terms. Additionally or alternatively, the sound processing engine 480 may determine various sound properties about the sounds proximate the media playback device 302 such as volume, dominant frequency or frequencies, etc. These sound properties may be used to make inferences about the environment proximate to the media playback device 302.

The voice interaction engine 482 operates to cooperate with the media delivery system 304 (e.g., a voice interaction server 404 thereof) to identify a command (e.g., a user intent) that is conveyed by the voice input 456. In some embodiments, the voice interaction engine 482 transmits the voice input 456 (e.g., of a user) that is detected by the sound processing engine 480 to the media delivery system 304 so that the media delivery system 304 operates to determine a command intended by the voice input 456. In other embodiments, at least some of the determination process of the command can be performed locally by the voice interaction engine 482.

In addition, some embodiments of the voice interaction engine 482 can operate to cooperate with the media delivery system 304 (e.g., the voice interaction server 404 thereof) to provide a voice assistant that performs various voice-based interactions with the user, such as voice feedbacks, voice notifications, voice recommendations, and other voice-related interactions and services.

Referring still to FIG. 4, the media delivery system 304 includes a media content server 400, a media content search server 402, a voice interaction server 404, a user command interpretation server 406, and term masking system 100.

The media delivery system 304 comprises one or more computing devices and provides media content to the media playback device 302 and, in some embodiments, other media playback devices as well. In addition, the media delivery system 304 interacts with the media playback device 302 to provide the media playback device 302 with various functionalities.

In at least some embodiments, the media content server 400, the media content search server 402, the voice interaction server 404, the user command interpretation server 406, and the term masking system 100 are provided by separate computing devices. In other embodiments, the media content server 400, the media content search server 402, the voice interaction server 404, the user command interpretation server 406, and the term masking system 100 are provided by the same computing device(s). Further, in some embodiments, at least one of the media content server 400, the media content search server 402, the voice interaction server 404, the user command interpretation server 406, and term masking system 100 is provided by multiple computing devices. For example, the media content server 400, the media content search server 402, the voice interaction server 404, the user command interpretation server 406, and the term masking system 100 may be provided by multiple redundant servers located in multiple geographic locations.

Although FIG. 4, for example shows a single media content server 400, a single media content search server 402, a single voice interaction server 404, a single user command interpretation server 406, and the term masking system 100 some embodiments include multiple media content servers, media content search servers, voice interaction servers, user command interpretation servers, and term masking systems. In these embodiments, each of the multiple media content servers, media content search servers, voice interaction servers, user command interpretation servers, and term masking system servers may be identical or similar to the media content server 400, the media content search server 402, the voice interaction server 404, the user command interpretation server 406, and the term masking system 100 respectively, as described herein, and may provide similar functionality with, for example, greater capacity and redundancy and/or services from multiple geographic locations. Alternatively, in these embodiments, some of the multiple media content servers, the media content search servers, the voice interaction servers, the user command interpretation servers and/or term masking system may perform specialized functions to provide specialized services. Various combinations thereof are possible as well.

The media content server 400 transmits stream media to media playback devices such as the media playback device 302. In some embodiments, the media content server 400 includes a media server application 412, a processing device 414, a memory device 416, and a data communication device 418. The processing device 414 and the memory device 416 may be similar to the processing device 448 and the memory device 450, respectively, which have each been previously described. Therefore, the description of the processing device 414 and the memory device 416 are omitted for brevity purposes.

The data communication device 418 operates to communicate with other computing devices over one or more networks, such as the network 306. Examples of the data communication device include one or more wired network interfaces and wireless network interfaces. Examples of such wireless network interfaces of the data communication device 418 include wireless wide area network (WWAN) interfaces (including cellular networks) and wireless local area network (WLANs) interfaces. In other examples, other types of wireless interfaces can be used for the data communication device 418.

In some embodiments, the media server application 412 is configured to stream media content, such as music or other audio, video, or other suitable forms of media content. The media server application 412 includes a media stream service 422, a media application interface 424, and a media data store 426. The media stream service 422 operates to buffer media content, such as media content items 430A, 430B, and 430N (collectively 430), for streaming to one or more media streams 432A, 432B, and 432N (collectively 432).

The media application interface 424 can receive requests or other communication from media playback devices or other systems, such as the media playback device 302, to retrieve media content items from the media content server 400. For example, in FIG. 3, the media application interface 424 receives communication from the media playback device 302 to receive media content from the media content server 400.

In some embodiments, the media data store 426 stores media content items 434, media content metadata 436, media contexts 438, user accounts 440, and taste profiles 442. The media data store 426 may comprise one or more databases and file systems. Other embodiments are possible as well.

As described herein, the media content items 434 (including the media content items 430) may be audio, video, or any other type of media content, which may be stored in any format for storing media content.

The media content metadata 436 provides various information (also referred to herein as attribute(s)) associated with the media content items 434. In addition or alternatively, the media content metadata 436 provides various information associated with the media contexts 438. In some embodiments, the media content metadata 436 includes one or more of title, artist name, album name, length, genre, mood, era, etc.

In some embodiments, the media content metadata 436 includes acoustic metadata, cultural metadata, and explicit metadata. The acoustic metadata may be derived from analysis of the track and refers to a numerical or mathematical representation of the sound of a track. Acoustic metadata may include temporal information such as tempo, rhythm, beats, downbeats, tatums, patterns, sections, or other structures. Acoustic metadata may also include spectral information such as melody, pitch, harmony, timbre, chroma, loudness, vocalness, or other possible features. Acoustic metadata may take the form of one or more vectors, matrices, lists, tables, and other data structures. Acoustic metadata may be derived from analysis of the music signal. One form of acoustic metadata, commonly termed an acoustic fingerprint, may uniquely identify a specific track. Other forms of acoustic metadata may be formed by compressing the content of a track while retaining some or all of its musical characteristics.

The cultural metadata refers to text-based information describing listeners' reactions to a track or song, such as styles, genres, moods, themes, similar artists and/or songs, rankings, etc. Cultural metadata may be derived from expert opinion such as music reviews or classification of music into genres. Cultural metadata may be derived from listeners through websites, chatrooms, blogs, surveys, and the like. Cultural metadata may include sales data, shared collections, lists of favorite songs, and any text information that may be used to describe, rank, or interpret music. Cultural metadata may also be generated by a community of listeners and automatically retrieved from Internet sites, chat rooms, blogs, and the like. Cultural metadata may take the form of one or more vectors, matrices, lists, tables, and other data structures. A form of cultural metadata particularly useful for comparing music is a description vector. A description vector is a multi-dimensional vector associated with a track, album, or artist. Each term of the description vector indicates the probability that a corresponding term would be used to describe the associated track, album or artist.

The explicit metadata refers to factual or explicit information relating to music. Explicit metadata may include album and song titles, artist and composer names, other credits, album cover art, publisher name and product number, and other information. Explicit metadata is generally not derived from the music itself or from the reactions or opinions of listeners.

At least some of the metadata 436, such as explicit metadata (names, credits, product numbers, etc.) and cultural metadata (styles, genres, moods, themes, similar artists and/or songs, rankings, etc.), for a large library of songs or tracks can be evaluated and provided by one or more third party service providers. Acoustic and cultural metadata may take the form of parameters, lists, matrices, vectors, and other data structures. Acoustic and cultural metadata may be stored as XML, files, for example, or any other appropriate file type. Explicit metadata may include numerical, text, pictorial, and other information. Explicit metadata may also be stored in an XML or other file. All or portions of the metadata may be stored in separate files associated with specific tracks. All or portions of the metadata, such as acoustic fingerprints and/or description vectors, may be stored in a searchable data structure, such as a k-D tree or other database format.

As described above, the media contexts 438 can include playlists 439. The playlists 439 are used to identify one or more of the media content items 434. In some embodiments, the playlists 439 identify a group of the media content items 434 in a particular order. In other embodiments, the playlists 439 merely identify a group of the media content items 434 without specifying a particular order. Some, but not necessarily all, of the media content items 434 included in a particular one of the playlists 439 are associated with a common characteristic such as a common genre, mood, or era.

In some embodiments, a user can listen to media content items in a playlist 439 by selecting the playlist 439 via a media playback device, such as the media playback device 302. The media playback device then operates to communicate with the media delivery system 304 so that the media delivery system 304 retrieves the media content items identified by the playlist 439 and transmits data for the media content items to the media playback device for playback.

In some embodiments, the playlist 439 includes one or more playlist descriptions. The playlist descriptions include information associated with the playlist 439. The playlist descriptions can include a playlist title. In some embodiments, the playlist title can be provided by a user using the media playback device 302. In other embodiments, the playlist title can be provided by a media content provider (or a media-streaming service provider). In yet other embodiments, the playlist title can be automatically generated.

Other examples of playlist descriptions include a descriptive text. The descriptive text can be provided by the user and/or the media content provider, which is to represent the corresponding playlist 439. In other embodiments, the descriptive text of the playlist description can be obtained from one or more other sources. Such other sources can include expert opinion (e.g., music reviews or classification of music into genres), user opinion (e.g., reviews through websites, chatrooms, blogs, surveys, and the like), statistics (e.g., sales data), shared collections, lists of favorite playlists, and any text information that may be used to describe, rank, or interpret the playlist or music associated with the playlist. In some embodiments, the playlist descriptions can also be generated by a community of listeners and automatically retrieved from Internet sites, chat rooms, blogs, and the like.

In some embodiments, the playlist descriptions can take the form of one or more vectors, matrices, lists, tables, and other data structures. A form of cultural metadata particularly useful for comparing music is a description vector. A description vector is a multi-dimensional vector associated with a track, album, or artist. Each term of the description vector indicates the probability that a corresponding term would be used to describe the associated track, album or artist. Each term of the description vector indicates the probability that a corresponding term would be used to describe the associated track, album or artist.

In some embodiments, the playlist 439 includes a list of media content item identifications (IDs). The list of media content item identifications includes one or more media content item identifications that refer to respective media content items 434. Each media content item is identified by a media content item ID and includes various pieces of information, such as a media content item title, artist identification (e.g., individual artist name or group name, or multiple artist names or group names), and media content item data. In some embodiments, the media content item title and the artist ID are part of the media content metadata

436, which can further include other attributes of the media content item, such as album name, length, genre, mood, era, etc. as described herein.

At least some of the playlists 439 may include user-created playlists. For example, a user of a media streaming service provided using the media delivery system 304 can create a playlist 439 and edit the playlist 439 by adding, removing, and rearranging media content items in the playlist 439. A playlist 439 can be created and/or edited by a group of users together to make it a collaborative playlist. In some embodiments, user-created playlists can be available to a particular user only, a group of users, or to the public based on a user-definable privacy setting.

In some embodiments, when a playlist is created by a user or a group of users, the media delivery system 304 operates to generate a list of media content items recommended for the particular user or the particular group of users. In some embodiments, such recommended media content items can be selected based at least on the taste profiles 442 as described herein. Other information or factors can be used to determine the recommended media content items.

In addition or alternatively, at least some of the playlists 439 are created by a media streaming service provider. For example, such provider-created playlists can be automatically created by the media delivery system 304. In some embodiments, a provider-created playlist can be customized to a particular user or a particular group of users. By way of example, a playlist for a particular user can be automatically created by the media delivery system 304 based on the user's listening history (e.g., the user's taste profile) and/or listening history of other users with similar tastes. In other embodiments, a provider-created playlist can be configured to be available for the public in general. Provider-created playlists can also be sharable with other users.

The user accounts 440 are used to identify users of a media streaming service provided by the media delivery system 304. In some embodiments, a user account 440 allows a user to authenticate to the media delivery system 304 and enable the user to access resources (e.g., media content items, playlists, etc.) provided by the media delivery system 304. In some embodiments, the user can use different devices to log into the user account and access data associated with the user account in the media delivery system 304. User authentication information, such as a username, an email account information, a password, and other credentials, can be used for the user to log into his or her user account. It is noted that, where user data is to be protected, the user data is handled according to robust privacy and data protection policies and technologies. For instance, whenever personally identifiable information and any other information associated with users is collected and stored, such information is managed and secured using security measures appropriate for the sensitivity of the data. Further, users can be provided with appropriate notice and control over how any such information is collected, shared, and used.

The taste profiles 442 contain records indicating media content tastes of users. A taste profile can be associated with a user and used to maintain an in-depth understanding of the music activity and preference of that user, enabling personalized recommendations, taste profiling and a wide range of social music applications. Libraries and wrappers can be accessed to create taste profiles from a media library of the user, social website activity and other specialized databases to obtain music preferences.

In some embodiments, each taste profile 442 is a representation of musical activities, such as user preferences and historical information about the users' consumption of media content, and can include a wide range of information such as artist plays, song plays, skips, dates of listen by the user, songs per day, playlists, play counts, start/stop/skip data for portions of a song or album, contents of collections, user rankings, preferences, or other mentions received via a client device, or other media plays, such as websites visited, book titles, movies watched, playing activity during a movie or other presentations, ratings, or terms corresponding to the media, such as "comedy," etc.

In addition, the taste profiles 442 can include other information. For example, the taste profiles 442 can include libraries and/or playlists of media content items associated with the user. The taste profiles 442 can also include information about the user's relationships with other users (e.g., associations between users that are stored by the media delivery system 304 or on a separate social media site).

The taste profiles 442 can be used for a number of purposes. One use of taste profiles is for creating personalized playlists (e.g., personal playlisting). An API call associated with personal playlisting can be used to return a playlist customized to a particular user. For example, the media content items listed in the created playlist are constrained to the media content items in a taste profile associated with the particular user. Another example use case is for event recommendation. A taste profile can be created, for example, for a festival that contains all the artists in the festival. Music recommendations can be constrained to artists in the taste profile. Yet another use case is for personalized recommendation, where the contents of a taste profile are used to represent an individual's taste. This API call uses a taste profile as a seed for obtaining recommendations or playlists of similar artists. Yet another example of taste profile use case is referred to as bulk resolution. A bulk resolution API call is used to resolve taste profile items to pre-stored identifiers associated with a service, such as a service that provides metadata about items associated with the taste profile (e.g., song tempo for a large catalog of items). Yet another example use case for taste profiles is referred to as user-to-user recommendation. This API call is used to discover users with similar tastes by comparing the similarity of taste profile item(s) associated with users.

A taste profile 442 can represent a single user or multiple users. Conversely, a single user or entity can have multiple taste profiles 442. For example, one taste profile can be generated in connection with a user's media content play activity, whereas another separate taste profile can be generated for the same user based on the user's selection of media content items and/or artists for a playlist.

Referring still to FIG. 4, the media content search server 402 operates to perform media content search in response to a media content search request, such as a user query. In some embodiments, the media content search server 402 includes a media content search application, a processing device, a memory device, and a data communication device (not shown). The processing device, the memory device, and the data communication device for the media content search server 402 may be similar to the processing device 414, the memory device 416, and the data communication device 418, respectively, which have each been previously described.

In some embodiments, the media deliver system 304 provides media content with masked terms. The media content search application can interact with other servers, such as the media content server 400, the voice interaction server 404, the user command interpretation server 406, and term masking system 100 to provide media content items having terms that have been masked according to the methods described above.

Referring still to FIG. 4, the voice interaction server 404 operates to provide various voice-related functionalities to the media playback device 302. In some embodiments, the voice interaction server 404 includes a voice recognition application, a speech synthesis application, a processing device, a memory device, and a data communication device (not shown). The processing device, the memory device, and the data communication device of the voice interaction server 404 may be similar to the processing device 414, the memory device 416, and the data communication device 418, respectively, which have each been previously described.

In some embodiments, the voice recognition application and the speech synthesis application, either individually or in combination, operate to interact with the media playback device 302 and enable the media playback device 302 to perform various voice-related functions, such as voice media content search, voice feedback, voice notifications, etc.

In some embodiments, the voice recognition application is configured to perform speech-to-text (STT) conversion, such as receiving a recording of voice command (e.g., an utterance) and converting the utterance to a text format.

In some embodiments, the speech synthesis application is configured to perform text-to-speech (TTS) conversion, so that a language text is converted into speech. Then, the voice interaction server 404 can transmit an audio data or file for the speech to the media playback device 302 so that the media playback device 302 generates a voice assistance to the user using the transmitted audio data or file.

Referring still to FIG. 4, the user command interpretation server 406 operates to analyze the user command (e.g., the utterance) to determine appropriate actions to take according to the user command. In some embodiments, the user command interpretation server 406 analyzes a text version of a user command (e.g., a text version of the utterance). In other embodiments, a recording of the user command can be used for such analysis without converting into a text format.

In some embodiments, the user command interpretation server 406 includes a natural language understanding (NLU) application, a processing device, a memory device, and a data communication device (not shown). The processing device, the memory device, and the data communication device of the user command interpretation service may be similar to the processing device 414, the memory device 416, and the data communication device 418, respectively, which have each been previously described.

In some embodiments, the NLU application operates to analyze the text format of the utterance to determine functions to perform based on the utterance. The NLU application can use a natural language understanding algorithm that involves modeling human reading comprehension, such as parsing and translating an input according to natural language principles.

Referring still to FIG. 4, the term masking system 100 operates to perform term masking on the media content items 430 being streamed. In some embodiments, the term masking system 100 includes a machine learning model 102, an aligner 104, an identifier 106, a muddler 108, and a dictionary database 116 as described above in connection with FIGS. 1 and 2. Term masking system 100 can also include a machine learning architecture 110 having a machine learning processor 112 communicatively coupled to a training set database 114 as described above in connection with FIG. 1, a processing device 274, a memory device 276, and a data communication device 278. The processing device 274, the memory device 276, and the data communication device 278 for the term masking system 100 may be similar to the processing device 414, the memory device 416, and the data communication device 418, respectively, which have each been previously described.

While various example embodiments of the present invention have been described above, it should be understood that they have been presented by way of example, and not limitation. It will be apparent to persons skilled in the relevant art(s) that various changes in form and detail can be made therein. Thus, the present invention should not be limited by any of the above described example embodiments, but should be defined only in accordance with the following claims and their equivalents.

In addition, it should be understood that the FIGS. 1-4 are presented for example purposes only. The architecture of the example embodiments presented herein is sufficiently flexible and configurable, such that it may be utilized (and navigated) in ways other than that shown in the accompanying figures.

Further, the purpose of the foregoing Abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract is not intended to be limiting as to the scope of the example embodiments presented herein in any way. It is also to be understood that the procedures recited in the claims need not be performed in the order presented.

What is claimed is:

1. A system for performing term masking, comprising:
    at least one processor operable to:
        generate a time-alignment value for a plurality of units of sound in vocal audio content contained in a mixed audio track;
        force-align each of the plurality of units of sound to the vocal audio content based on the time-alignment value, thereby generating a plurality of force-aligned units of sound;
        identify from the plurality of force-aligned units of sound a force-aligned unit of sound to be altered; and
        alter the identified force-aligned unit of sound.

2. The system of claim 1, wherein altering the identified force-aligned unit of sound comprises audio muddling of the identified force-aligned unit of sound.

3. The system of claim 1, wherein each of the plurality of the units of sound in the vocal audio content corresponds to at least one of (i) a term in lyrics, (ii) a phoneme in the lyrics, or (iii) both (i) and (ii).

4. The system of claim 3, the at least one or more processors is further operable to:
    compare a dictionary of terms against the plurality of force-aligned units of sound; and
    match at least one of the terms in the dictionary to at least one of the plurality of force-aligned units of sound,
    wherein identifying the force-aligned unit of sound to be altered comprises identifying the at least one of the plurality of force-aligned units of sound as a force-aligned unit of sound to be altered.

5. The system of claim 1, wherein the at least one processors force-aligns each of the plurality of units of sound to the vocal audio content based on the time-alignment value by using (i) a Hidden Markov model, (ii) a plurality of Mel-frequency cepstral coefficients (MFCCs), and (iii) a dynamic programming algorithm.

6. The system of claim 1 wherein the at least processors audio muddles the identified forced-aligned unit of sound by generating a backwards version of the identified force-aligned unit of sound.

7. The system of claim 1, wherein the at least one processor further comprises at least one machine learning model and is further operable to separate, using the at least one machine learning model, vocal audio content from the mixed audio track.

8. The system of claim 7, wherein the at least one or more processors is further operable to:
   train the at least one machine learning model on a plurality of pairs of original and instrumental-only magnitude spectrograms.

9. The system of claim 7, wherein the at least one machine learning model is trained on original and instrumental-only pairs of songs.

10. A method for performing term masking, comprising the steps of:
   generating a time-alignment value for a plurality of units of sound in vocal audio content contained in a mixed audio track;
   force-aligning each of the plurality of units of sound to the vocal audio content based on the time-alignment value, thereby generating a plurality of force-aligned units of sound;
   identifying from the plurality of force-aligned units of sound a force-aligned unit of sound to be altered; and
   altering the identified force-aligned unit of sound.

11. The method of claim 10, wherein altering the identified force-aligned unit of sound comprises audio muddling the identified force-aligned unit of sound.

12. The method of claim 10, wherein each of the plurality of the units of sound in the vocal audio content corresponds to at least one of (i) a term in lyrics, (ii) a phoneme in the lyrics, or (iii) both (i) and (ii).

13. The method of claim 12, wherein identifying the force-aligned unit of sound to be altered includes:
   comparing terms in a dictionary against the plurality of force-aligned identifiable units of sound;
   matching at least one of the terms in the dictionary to at least one of the plurality of force-aligned units of sound; and
   identifying the at least one of the plurality of force-aligned units of sound as a force-aligned unit of sound to be altered.

14. The method of claim 10, wherein the force-aligning includes:
   representing acoustics of the vocal audio content as a plurality of Mel-frequency cepstral coefficients (MFCCs);
   computing, using a Hidden Markov model, a mapping between words and the plurality of MFCCs; and
   matching, using a dynamic programming algorithm.

15. The method of claim 11 wherein the audio muddling includes:
   generating a backwards version of the force-aligned unit of sound to be muddled.

16. The method of claim 10, further comprising using at least one machine learning model to separate vocal audio content from the mixed audio track, wherein the vocal audio content contains lyrics.

17. The method of claim 16, further comprising:
   training the at least one machine learning model on a plurality of pairs of original and instrumental-only magnitude spectrograms.

18. The method of claim 16, wherein:
   the at least one machine learning model is trained on original and instrumental-only pairs of songs.

19. A system for performing term masking, the system comprising one or more processors configured to operate as:
   a machine learning model configured to receive a mixed audio track including vocal audio content containing a plurality of units of sound, and non-vocal audio content, and separate vocal audio content from the mixed audio track;
   a first processor programmed to:
      generating a time-alignment value for each of the plurality of units of sound; and
      force-align each of the plurality of units of sound to the vocal audio content based on the time-alignment value, thereby generating a plurality of force-aligned units of sound;
   a second processor programmed to identify from the plurality of force-aligned units of sound a force-aligned unit of sound to be altered; and
   a third processor programmed to alter the identified force-aligned unit of sound.

20. The system of claim 19, wherein each of the plurality of the units of sound in the vocal audio content corresponds to at least one of (i) a term in lyrics, (ii) a phoneme in the lyrics, or (iii) both (i) and (ii).

* * * * *

UNITED STATES PATENT AND TRADEMARK OFFICE
CERTIFICATE OF CORRECTION

PATENT NO. : 11,574,627 B2
APPLICATION NO. : 17/379325
DATED : February 7, 2023
INVENTOR(S) : Andreas Jansson et al.

It is certified that error appears in the above-identified patent and that said Letters Patent is hereby corrected as shown below:

On the Title Page

In Item (57) the Abstract, Column 2, Line 6, "force-aligned identifiable units" should read "force-aligned units".

In the Claims

In Claim 4, Column 18, Line 54-55, "the at least one or more processors" should read "wherein the at least one processor".

In Claim 5, Column 18, Line 65, "processors" should read "processor".

In Claim 6, Column 19, Line 3, "least processors" should read "least one processor".

In Claim 8, Column 19, Line 13, "processors" should read "processor".

In Claim 13, Column 19, Line 42, "force-aligned identifiable units" should read "force-aligned units".

Signed and Sealed this
Fifth Day of September, 2023

Katherine Kelly Vidal
*Director of the United States Patent and Trademark Office*